United States Patent [19]

Reboulet et al.

[11] Patent Number: 5,219,266
[45] Date of Patent: Jun. 15, 1993

[54] HANDLING DEVICE FOR DISPLACING AN OBJECT IN THREE DIMENSIONS PARALLEL TO ITSELF

[75] Inventors: Claude Reboulet, Castanet Tolosan; Claude Lambert, Ramonville, both of France

[73] Assignee: Office National d'Etudes et de Recherches Aerospatiales, Chatillon Bagneux, France

[21] Appl. No.: 808,810

[22] Filed: Dec. 18, 1991

[30] Foreign Application Priority Data

Dec. 18, 1990 [FR] France .................................. 90 15846

[51] Int. Cl.[5] .............................................. B25J 9/00
[52] U.S. Cl. .................................. 414/733; 74/479 R
[58] Field of Search ................... 414/733, 729; 74/479; 901/15, 21, 22, 28, 29

[56] References Cited

U.S. PATENT DOCUMENTS 3,160,290 12/1964 Wilson .
4,651,589 3/1987 Lambert ............................. 901/22 X

FOREIGN PATENT DOCUMENTS 0076947 4/1983 European Pat. Off. .
0263627 4/1988 European Pat. Off. .
1080074 8/1967 United Kingdom .
8703528 6/1987 World Int. Prop. O. .

Primary Examiner—Michael S. Huppert
Assistant Examiner—Donald W. Underwood
Attorney, Agent, or Firm—Larson and Taylor

[57] ABSTRACT

A handling device enabling an object to be displaced in such a manner that it retains a predetermined attitude, the device having:

a fixed base (1); a moving object (2); and three actuators (3) interposed between the base (1) and the object (2), with each actuator comprising: a hinge (9) that is displaceable over a circular trajectory (C) in a vertical plane; at least one driving actuator (4) pivotally supported (6) by the base and connected at its moving end to the hinge whose circular trajectory is centered on a fixed point (O) of the base which is separate from the pivot axis (6) of the actuator; and a connecting bar (10) of fixed length between the object (2) and the hinge (9), the bar supporting two wheels (11) that are coupled together to rotate in the same direction and with the same amplitude by an attitude transmission member (14).

9 Claims, 3 Drawing Sheets

HANDLING DEVICE FOR DISPLACING AN OBJECT IN THREE DIMENSIONS PARALLEL TO ITSELF

The present invention relates to improvements to a handling device enabling an object to be displaced in three dimensions in such a manner as to enable the object to conserve a predetermined attitude while it is being displaced, said device comprising a fixed base, a moving element constituting said object or to which said object is connected, and at least three actuators interposed between the base and the moving element and mutually offset by identical angles, each of the actuator means being active in a substantially vertical plane and comprising:

a hinge which is displaceable along a circular trajectory lying in the above-mentioned substantially vertical plane;

a drive member supported by the base and connected at its moving end to said hinge, said drive member being suitable for imparting linear displacement to its moving end in said plane; and a link member of fixed length interposed between the moving element and the hinge and rotatably hinged to each of them.

In a known handling device of this type, the drive member of each actuator means is constituted by an actuator secured to the base with its moving portion being driven in translation in a fixed direction, while the fixed length link member is a deformable parallelogram whose end short sides are rotatably hinged respectively to the moving portion of the actuator and to the moving element. In such an arrangement, in order to keep the direction of each of the short sides constant, i.e. in order to prevent any rotation about the translation axis, it is essential to use a slideway system that is extremely accurate and thus expensive. Moreover, the inertia of the slideway system is added to that of the actuator and as a result it penalizes the acceleration performance of the apparatus.

Unfortunately, and regardless of the type of its structure, a handling device is required in general to enable the moving element to be moved quickly and to be positioned quickly, which means that it is liable to develop high accelerations. In general, this can only be obtained with mechanical structures of weight and thus inertia that are as small as possible.

The above-specified known device is thus unsatisfactory from this point of view.

In addition, the deformable parallelogram solution used for making up each link member in the known handling device suffers from the drawback of restricting the working volume because of the limited mutual angular inclinations available to the arms of the parallelograms. To ensure that the structure is rigid, it is not desirable for the distance between the two main arms of the parallelogram to be less than some minimum value, and this consequently limits the angle that is acceptable between pairs of adjacent arms.

Furthermore, the parallelogram structure suffers from the drawback of having a large number of passive hinges: the play in each of these hinges naturally has an unfavorable effect on the accuracy of the displacement or the positioning which the handling device can provide.

An essential object of the invention is to remedy the above-explained drawbacks presented by the above-mentioned known handling device and to provide an improved arrangement for a handling device of the type described in the introduction that satisfies various practical requirements better, in particular with respect to suitability for high accelerations and with respect to the amplitude of the movements of its actuator means.

To these ends, the present invention provides a handling device as defined in the introduction that is essentially characterized in that for each actuator means:

the drive member comprises at least one actuator which is supported by the base so as to be capable of pivoting relative thereto in said vertical plane;

the circular trajectory of the displaceable hinge is centered on a fixed point of the base situated in said vertical plane and not coinciding with the pivot axis of the actuator constituting the drive member;

the fixed length link member comprises a bar supporting a rotary part at each of its ends, said rotary parts being secured to two respective yokes which are respectively rotatably hinged to said hinge and to said moving element, an attitude transmission member also extending between said two rotary parts to couple them together in such a manner that any rotary displacement of one of the rotary parts is transformed into displacement of the other rotary part that is identical in direction and amplitude, and that the rotary connection axes of the two yokes with the hinge and the moving element respectively remain permanently mutually parallel; and all of the hinges are about axes that are substantially perpendicular to said vertical plane.

In a particular embodiment of the invention, the rotary parts are wheels of substantially the same diameter.

Advantageously, in order to provide an embodiment that is technically simple, the attitude transmission member is an endless link wound over the two rotary parts, preferably a cog belt.

In practice, the radius of the circular trajectory over which the hinge is displaced is set by a connecting rod extending between said hinge and the fixed point on the base, and hinged to both of them.

In one possible embodiment, the connecting rod is a rod of fixed length; to ensure more regular displacement, it is then advantageous to provide for the drive member to comprise two actuators disposed in said vertical plane on either side of the connecting rod of fixed length.

In another particular embodiment, which enlarges the operating range of the handling device, the connecting rod is variable in length and may be constituted for this purpose by an actuator, whereby the radius of the circular trajectory of the hinge can be adjusted.

The invention will be better understood on reading the following detailed description of a preferred embodiment given purely by way of example. The description makes reference to the accompanying drawings, in which.

Figure 1:
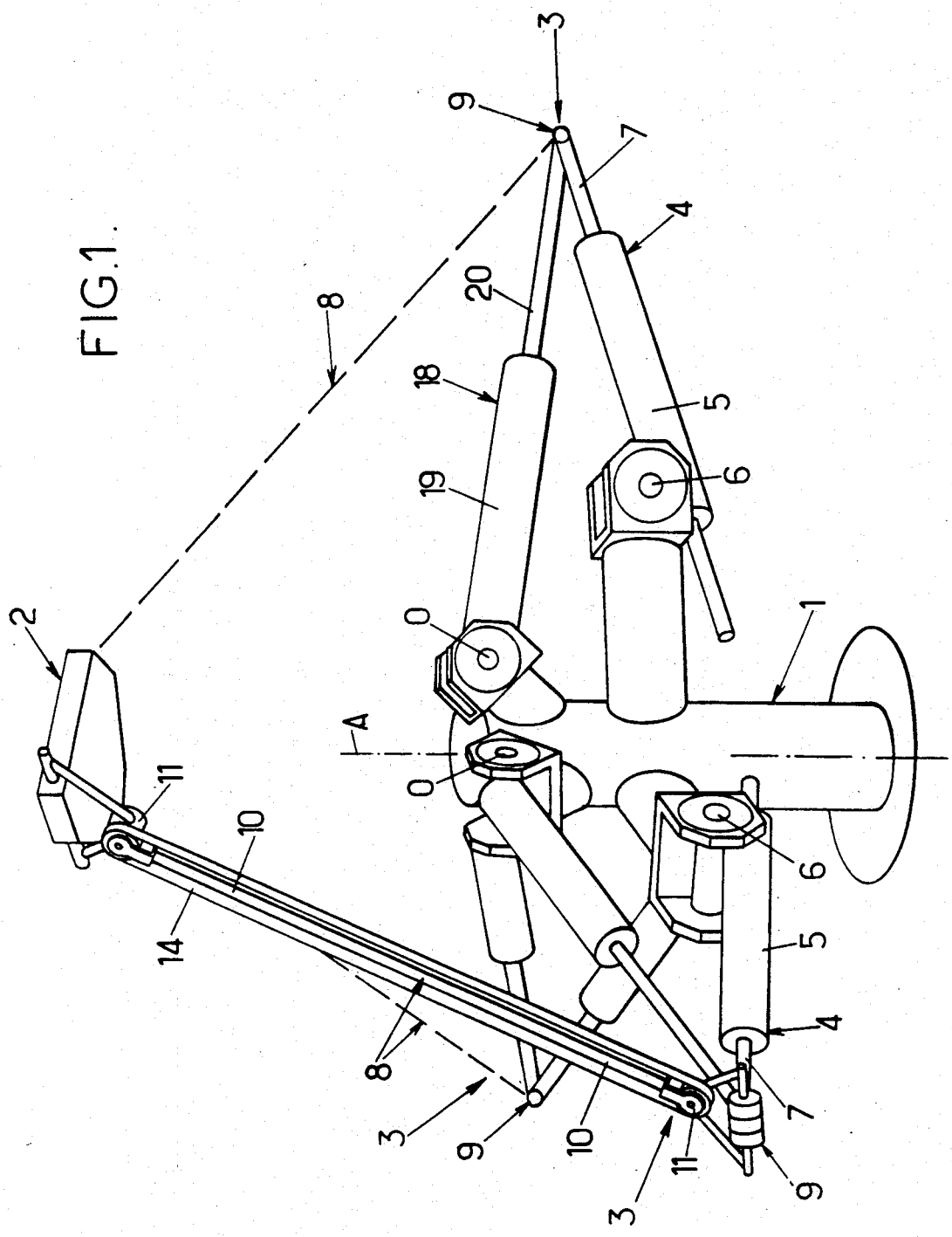
FIG. 1 is an overall perspective view of a handling device of the invention.

With reference to the figures, and initially more particularly with reference to FIG. 1, the handling device of the invention comprises: a stationary base 1, e.g. in the form of a post; a moving element 2 constituting the object to which the object that is to be moved in translation parallel to itself is connected, i.e. that requires to be moved in such a manner as to remain in a predetermined attitude during its displacement; and three actuator means each given an overall reference 3, said actuator means being interposed between the base 1 and the moving element 2 and being mutually offset by angles, i.e. of about 120°.

As appears more clearly below, each of the actuator means 3 comprises a set of parts that are hinged to one another, and to the base 1, and to the object 2 in such a manner as to ensure that they remain permanently in the same mean plane that includes the central axis A of the base 1. Given the orientation in which the handling device is shown in the figure, the description below assumes that the base 1 stands on a horizontal support and that its axis A is thus vertical, but it should nevertheless be understood that this assumption is merely to simplify the description and that the handling device can be implemented in any position. In this context, the three above-mentioned mean planes of the actuator means are said to be substantially vertical.

More specifically, each of the actuator means 3 comprises:

a drive member including at least one actuator 4 whose body 5 is hinged to rotate on the base 1 about a horizontal axis 6 so that the actuator 4 is free to pivot relative to the base in a vertical plane, the actuator body 5 containing an actuator rod 7 that is displaceable linearly;

a link member given an overall reference 8 which is of fixed length, which is interposed between the moving element 2 and the free end of the actuator rod 7, and which is hinged to each of them; and a hinge given an overall reference 9 which connects the free end of the actuator rod 7 to the corresponding end of the link member 8 while allowing them to rotate relative to each other, the hinge 9 being displaceable over a circular trajectory lying in the mean vertical plane of the corresponding actuator means and centered on a fixed point O of the base that does not coincide with said pivot axis 6 about which the actuator 4 pivots.

Figure 2:
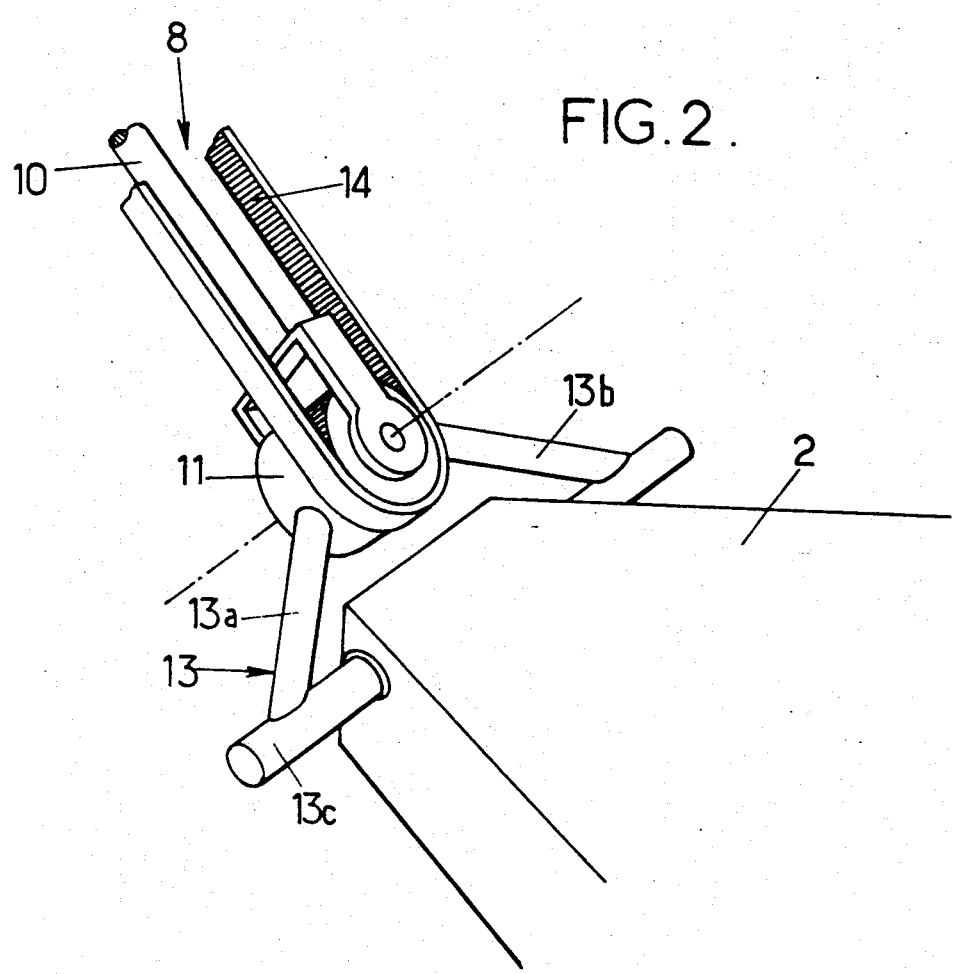
FIGS. 2 and 3 are perspective views on a larger scale of certain structural details of the handling device of FIG. 1.
Figure 3:
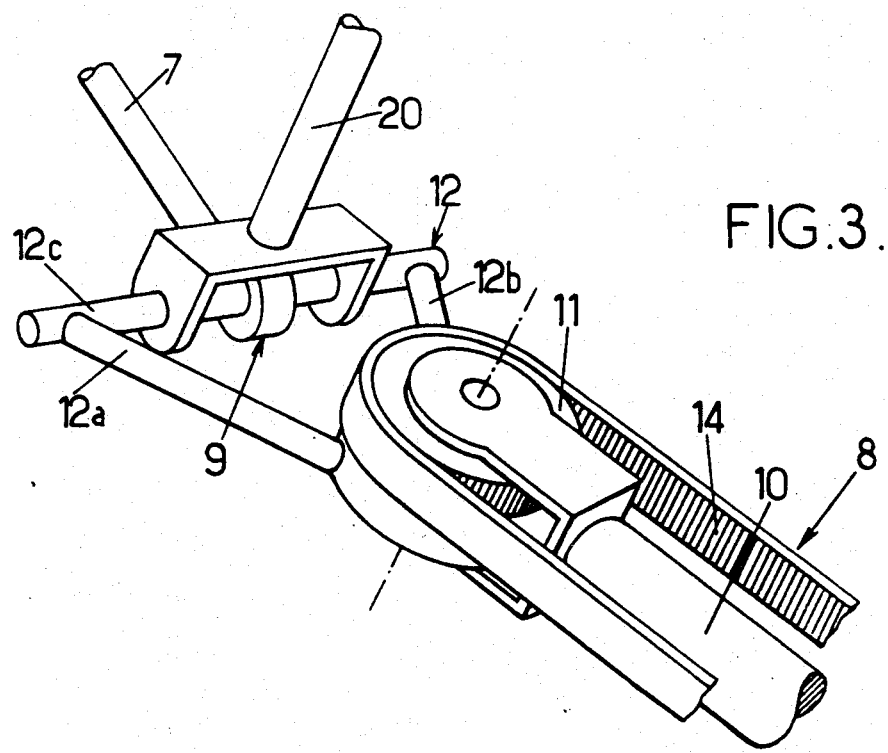

As shown in FIGS. 1, 2, and 3, the fixed length link member 8 comprises a rigid bar 10 supporting two rotary pieces, one at each end, which pieces are constituted in the technologically simple embodiment shown in the figures by two same-diameter wheels 11. These two wheels are constrained to rotate together with respective yokes 12 and 13 respectively linked to the hinge 9 and to the moving element 2 with one degree of freedom in rotation in each case.

In the example shown in FIG. 2, the yoke 13 is a triangle structure comprising two radial bars 13a and 13b secured to the wheel 11 and secured to a third bar 13c which is pivotally connected to the moving element 2 in such a manner that the axis of rotation of the wheel 11 and the axis of rotation of the bar 13c are orthogonal. Similarly, in the example of FIG. 3, the yoke 12 is a triangle structure comprising two radial bars 12a and 12b secured to the wheel 11 and secured to a third bar 12c on which the end of the actuator rod 7 is pivotally engaged in such a manner that the axis of rotation of the wheel 11 and the axis of rotation of the bar 12c are orthogonal. The axes of rotation of the two wheels 11 are parallel and both of them are perpendicular to the bar 10.

In addition, an attitude transmission member 14 extends between the two wheels 11 to couple them together in such a manner that any angular displacement of one of these wheels is transformed into an angular displacement of the other wheel that is identical in direction and in amplitude such that the two bars 12c and 13c belonging respectively to the two yokes 12 and 13 remain permanently in a mutually parallel configuration.

Although numerous embodiments are possible for implementing the attitude transmission member 14, the solution that turns out to be both the most reliable and the most simple is to implement said member 14 in the form of a non-extensible flexible endless link that turns round each of the two wheels 11 and that co-operates therewith in rotation without sliding. It is thus advantageous to use toothed wheels co-operating with a cog belt, sprocket wheels with a "bicycle" chain, or any other analogous arrangement that provides coupling without slipping. In order to be sure that the endless link does not slide over the wheels, it is also possible to secure the transmission member 14 to the wheels 11 by mechanical means such as a screw or the like (not shown).

Figure 4:
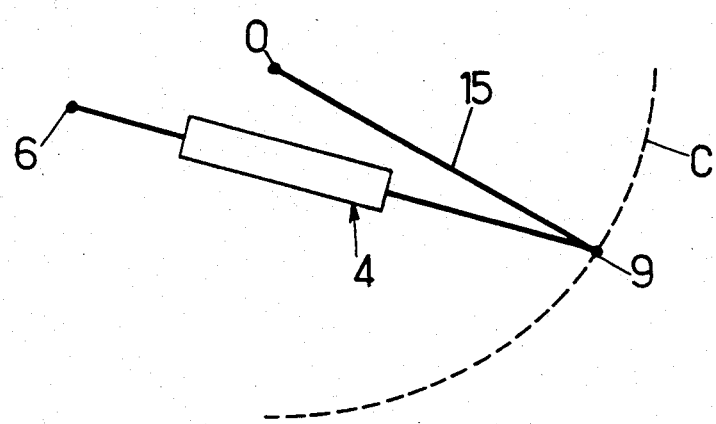
FIGS. 4 and 5 are diagrams respectively showing two variant embodiments of the handling device of FIG. 1.

With reference now to the actuator means, holding the bar 12c of the hinge 9 in a position perpendicular to the mean vertical plane that includes the axis A requires an additional link between the bar 12c and a fixed point O on the base 1. Such a link may be constituted by a simple connecting rod 15 which is hinged at one end to the base 1 at O and at its other end to the hinge 9 as shown in FIG. 4. Under the driving force of the actuator 4, the hinge 9 then moves along a circular trajectory C centered on O and lying in the mean vertical plane containing the axis A.

Figure 5:
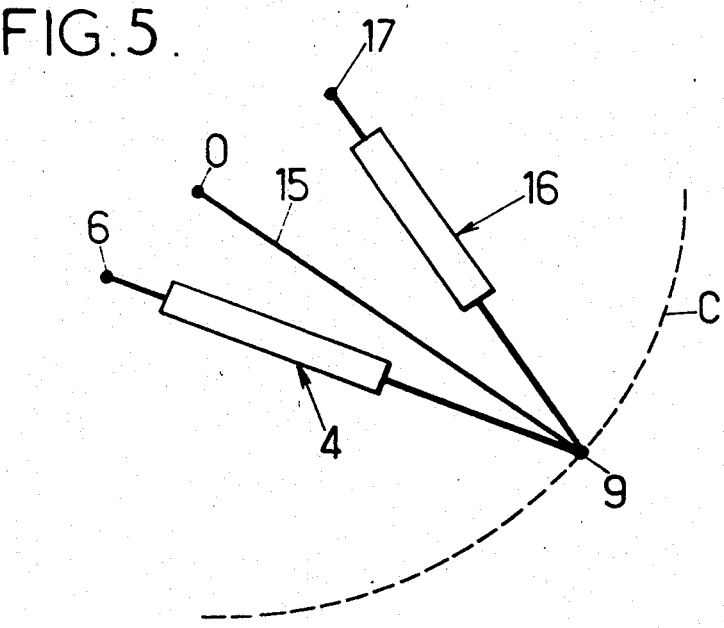

It is also possible, as shown in FIG. 5, to add to the above structure by providing a second actuator 16 which is hinged at its ends firstly to the hinge 9 and secondly to a fixed point 17 on the base 1, with the two actuators 14 and 16 being preferably disposed in such a manner that O lies substantially halfway between the hinges 16 and 17. Here again, the hinge 9 can only describe a circular trajectory C centered on O and situated in the mean vertical plane that includes the axis A. By having two actuators, it is possible to ensure a more uniform development of forces regardless of the position of the hinge 9 on its trajectory C.

Nevertheless, a technical solution that appears to be particularly advantageous is that shown in the overall view of FIG. 1 in which the link between the point O on the base 1 and the hinge 9 is provided by an actuator 18. The body 19 of the actuator is rotatably hinged to the base 1 about an axis O that extends transversely to the mean vertical plane and to the axis A, while the rod 20 of the actuator is rotatably hinged to the above-mentioned bar 12c. This disposition constitutes a variant of that shown in FIG. 5, in which the rigid connecting rod 15 is omitted.

The hinge 9 is thus released from the constraint, as imposed by having a rigid connecting rod 15, of being able to move over a single circular trajectory C only, and it is now capable of following an infinity of circular trajectories centered on O and having variable radii as determined by the modifiable length of the second actuator 18. In other words, the hinge 9 is free to occupy any position in the mean vertical plane including the axis A while remaining continuously parallel to itself and perpendicular to the plane.

To achieve this property, it suffices that one only of the two actuators 4 and 18 (e.g. the actuator 4) has a rotary hinge about a fixed axis (in this case the axis 6), while the other actuator (in this case 18) is provided with a hinge at O having several degrees of freedom such as a universal joint or a ball-and-socket joint.

It will also be observed that although this embodiment having two actuators 4 and 18 enables each of the actuator rods to rotate about the bar 12c that interconnects them and that has the corresponding hinge 9, the assembly is self-locking, i.e. the bar 12c remains parallel to itself (and perpendicular to the mean vertical plane) and parallel to the respective hinge axes of the two actuator bodies 4 and 18 without requiring any additional mechanical guide device, and this is in contrast to the requirements of known handling devices in which the actuator means include one actuator only.

It may also be observed that most of the forces are exerted in the mean vertical plane including the axis A. The structure is triangulated and it is thus possible to transmit large forces with little material, and thus in particular to use actuators whose rods have relatively little mass. The inertia of the moving masses is thus reduced, thereby imparting greater acceleration capacities to the device.

Finally, it may be observed that the actuator means having two actuators 4 and 18 as shown in FIG. 1 constitute a redundant system, i.e. there is a plurality of possible configurations for the actuators that all correspond to a given position of the moving object 2, unlike the embodiments of FIGS. 4 and 5 which are not redundant. This redundancy of the FIG. 1 embodiment constitutes a characteristic which is particularly advantageous since it can be taken advantage of to increase the ability of the system to acceleration. Since multiple possible configurations of the actuators are available corresponding to a given position of the moving object 2, there exists an infinity of possible trajectories in the hinge space of the device for giving rise to a given trajectory of the moving object 2. These additional degrees of freedom can then be used to optimize the trajectory, i.e. to make use at all times of the maximum acceleration allowed by the actuators and thus to displace the moving object 2 as quickly as possible between a starting position and a finishing position.

The lightness of the handling device of the invention is worth emphasizing. In general, all parallel type handling devices and the device of the invention is a parallel type handling device are intrinsically lighter than serial type handling devices. This lightness is essentially due to two reasons:

the structure is relatively well triangulated and therefore offers an extremely good ratio of working mass to dead mass; and the dead portions of all drive members (stator of an electric motor, actuator body of a hydraulic or pneumatic actuator) are fixed to the fixed support and they therefore do not move relative to the drive member situated immediately upstream therefrom, which is in contrast to serial type dynamic systems.

However, given the increased lightness that it is possible to impart to some of the members of the handling device of the invention, this device has even less inertia than presently known parallel type handling devices, and its acceleration performance is therefore further increased.

Thus, the redundancy of the system in co-operation with a very high degree of lightness provides the device of the invention with very high acceleration power, thereby making it possible to decrease cycle times significantly, to the satisfaction of users.

Furthermore, the special design used for ensuring that the bars 12c and 12c remain parallel makes it possible to achieve much greater angular displacement than is possible using a conventional parallelogram structure. The field of application for the device is thus further enlarged.

The redundant structure of the actuator means also makes it possible to operate under fault conditions with one or more of the driving members broken down, and this can be advantageous in some applications.

Finally, the parallel type structure of the handling device of the invention is easily implemented in modular form, thereby facilitating manufacture and maintenance. This gives rise to non-negligible savings.

As can be seen from the above, the invention is naturally not limited in any way to the particular applications and embodiments that are described in detail, but on the contrary, it extends to all variants thereof.

For example, an axis of rotation may be mounted on the element 2, thereby conferring an additional degree of rotation to the handling device which is particularly advantageous in robotics in applications where objects need to be rotated.

We claim:

1. A handling device enabling a moving element to be displaced in three dimensions in such a manner as to enable the moving element to conserve a predetermined attitude while it is being displaced, said device comprising a fixed base, a moving element and at least three actuator means interposed between the base and the moving element and mutually offset by identical angles, each of the actuator means being active in a substantially vertical plane and comprising:

a hinge which is displaceable along a circular trajectory lying in said substantially vertical plane;

a drive member supported by the base and connected at its moving end to said hinge, said drive member being suitable for imparting linear displacement to its moving end in said plane; and a link member of fixed length interposed between the moving element and the hinge and rotatably hinged to each of them;

the device being characterized in that for each actuator means:

the drive member comprises at least one actuator which is supported by the base so as to be capable of pivoting relative thereto in said vertical plane;

the circular trajectory of the displaceable hinge is centered on a fixed point of the base situated in said vertical plane and not coinciding with the pivot axis of the actuator constituting the drive member, and is set by a connecting means which extends between said hinge and said fixed point of the base and which is hinged to both of them;

the fixed length link member comprises a bar supporting a rotary part at each of its ends, said rotary parts being secured to two respective yokes which are respectively rotatably hinged to said hinge and to said moving element, an attitude transmission member also extending between said two rotary parts to couple them together in such a manner that any rotary displacement of one of the rotary parts is transformed into displacement that is identical in direction and amplitude of the other rotary part, and that the rotary connection axes of the two yokes with the hinge and the moving element respectively remain permanently mutually parallel; and all of the hinges are about axes that are substantially perpendicular to said vertical planes.

2. A handling device according to claim 1, characterized in that the rotary parts are wheels of substantially the same diameter.

3. A handling device according to claim 1, characterized in that the attitude transmission member is an endless link wound over the two rotary parts.

4. A handling device according to claim 3, characterized in that the endless link is a cog belt.

5. A handling device according to claim 1, wherein said connecting means comprises a connecting rod.

6. A handling device according to claim 5, characterized in that the connecting rod is a rod of fixed length.

7. A handling device according to claim 6, characterized in that the drive member comprises two actuators disposed in said vertical plane on either side of the connecting rod of fixed length.

8. A handling device according to claim 5, characterized in that the connecting rod is of adjustable length, thereby enabling the radius of the circular trajectory of the hinge to be adjusted.

9. A handling device according to claim 8, characterized in that the variable length connecting rod is constituted by an actuator.

* * * * *